United States Patent [19]
Hashimoto et al.

[11] Patent Number: 5,634,543
[45] Date of Patent: Jun. 3, 1997

[54] DAMPER DISC ASSEMBLY HAVING MULTIPLE FRICTION GENERATING PORTIONS

[75] Inventors: Yasuyuki Hashimoto, Neyagawa; Hiroshi Teramae, Nara; Yasushi Takehira, Kobe, all of Japan

[73] Assignee: Exedy Corporation, Osaka, Japan

[21] Appl. No.: 428,439

[22] Filed: Apr. 25, 1995

[30] Foreign Application Priority Data

Apr. 25, 1994 [JP] Japan .................................. 6-086848
Jul. 11, 1994 [JP] Japan .................................. 6-158921

[51] Int. Cl.$^6$ ........................................... F16D 3/14
[52] U.S. Cl. ........................... 192/213.21; 192/213.3; 192/70.18; 464/68
[58] Field of Search ......................... 192/213.21, 213.3, 192/214, 70.17, 70.18; 464/68

[56] References Cited

U.S. PATENT DOCUMENTS

| | | | |
|---|---|---|---|
| 4,548,309 | 10/1985 | Braun | 192/70.18 X |
| 4,650,053 | 3/1987 | Kayanoki et al. | 192/213.21 |
| 4,883,156 | 11/1989 | Rohrle et al. | 464/68 X |
| 5,014,842 | 5/1991 | Graton et al. | 464/68 X |
| 5,025,904 | 6/1991 | Graton et al. | |
| 5,117,959 | 6/1992 | Graton | 464/68 |
| 5,217,409 | 6/1993 | Dalbiez | 464/68 |
| 5,240,458 | 8/1993 | Linglain et al. | |
| 5,246,398 | 9/1993 | Birk et al. | 464/68 X |
| 5,251,736 | 10/1993 | Jeppe et al. | 192/70.18 X |
| 5,433,307 | 7/1995 | Jeppe | 464/64 X |
| 5,529,161 | 6/1996 | Ament et al. | |

FOREIGN PATENT DOCUMENTS

| | | |
|---|---|---|
| 40 09 915 A1 | 10/1990 | Germany. |
| 42 09 511 A1 | 10/1992 | Germany. |
| 43 40 282.8 | 6/1995 | Germany. |
| 44 39 897 A1 | 6/1995 | Germany. |

*Primary Examiner*—Andrea L. Pitts
*Attorney, Agent, or Firm*—Shinjyu Office of Patent Attorneys

[57] ABSTRACT

In a first embodiment, a clutch disk assembly has a retaining plate 5, a hub 2, a first coil spring 6, a second coil spring 7, and a first friction washer 8. A connecting plate 3 is positioned in an outer circumference of the of the hub 2. The first coil spring elastically couples the connecting plate 3 and the hub 2 in a circular direction. The second coil spring 7 elastically couples the retaining plate 5 and the connecting plate 3 in a circular direction and is more excellent in rigidity than the first coil spring 6. The first friction washer 8 includes a first friction member 13 positioned between the retaining plate 5 and the hub 2, a second friction member 14 positioned between the connecting plate 3 and the retaining plate 5, and a coupling element coupling the first and second friction members 13 and 14 and elastically deformable in axial directions. In a second embodiment, a friction resistance generating mechanism 108, a first friction washer 114 is in contact with a side surface of a flange in a hub 102. A second friction washer 115 is in contact with a side surface of a sub-plate 105 and engages the first friction washer 114 so as to rotate along with it in unity in circular directions and to move relative to it in axial directions. A first conical spring 116 urges the first friction washer 114 toward the flange. A second conical spring 117 urges the second friction washer 115 toward the sub-plate 105. Only one of the first friction washer 114 and the second friction washer 115 has snap projections and stem-like projections which engage a retaining plate 104 so as to rotate along with it in unit in circular directions and to move relative to it in axial directions.

14 Claims, 11 Drawing Sheets

DAMPER DISC ASSEMBLY HAVING MULTIPLE FRICTION GENERATING PORTIONS

BACKGROUND OF THE INVENTION

A) Field of the Invention

The present invention relates to a clutch disc damper assembly, and more particularly, to a clutch disc damper assembly having a separated hub and a friction generating construction having multiple friction generating portions.

B) Description of the Related Art

A damper mechanism in a clutch disc for use in a motor vehicle typically includes a power input plate, a power output hub formed with a radially extending flange, and an elastic element elastically coupling the power input plate and the flange.

Alternatively, clutch discs have also been provided with a hub, an intermediate plate and a power input plate where a first elastic element having a relatively low rigidity which couples the intermediate plate and hub in addition to a second elastic element which couples the power input plate and the intermediate plate. This type of damper disc assembly is such that relative torsional displacement between the input plate and the hub includes two levels of vibration damping due to the characteristics of the two springs, the first spring having characteristics of low rigidity and the second spring having characteristics of high rigidity.

Further, such a damper disc assembly may include a first friction element positioned between the power input plate and the hub so as to generate friction force (hysteresis torque) upon relative rotation between the power input plate and the hub. A second friction element is disposed between the intermediate plate and the power input plate.

In such a separate hub/intermediate plate type damper disc assembly, a minor torsional vibration, when transmitted, causes relative rotation between the power input plate and connecting plate, and the power output hub. This results in the elastic element of low rigidity to repetitively expand and be compressed, and the first friction element slides between the power input plate and the connecting plate to create a small friction force. A major torsional vibration, when transmitted, causes relative rotation between the power input plate, and the intermediate plate and power output hub. This results in the elastic elements to repetitively expand and be compressed, and the second friction element slides between the power input plate and the connecting plate to cause a relatively large friction force. The property of low rigidity and small friction force is effective for dampening minor torsional vibrations while the property of high rigidity and large friction force is effective for dampening major torsional vibrations, and thus, any vibration can be dampened well.

The damper clutch disc assembly in the prior art has two separate and distinct friction elements respectively engaged with the power input plate so as not to rotate relative to it but to be movable relative to it in axial directions in order to generate various levels of the friction force corresponding to various levels of the torsional vibration. This leads to increase in components like engaging elements in the friction elements.

SUMMARY OF THE INVENTION

Accordingly, it is an object of the present invention to simplify the structure of the separated hub type damper disc assembly and reduce the number of friction elements and engaging elements in friction a mechanism.

It is another object of the present invention to retain a stable friction vibration dampening force in a damper disc.

In one aspect of the present invention in accordance with a first embodiment of the present invention, a clutch disc assembly has a power input rotating element, a disk plate, a power output hub, a first elastic element, a second elastic element and a friction element. The disk plate is positioned adjacent to an outer circumference of the hub. The first elastic element elastically couples the disk plate to the hub in a circular direction. The second elastic element elastically couples the power input rotating element to the disk plate in a circular direction and is more rigid than the first elastic element. The friction element includes a first friction portion positioned between the power input rotating element and the hub, a second friction portion positioned between the disk plate and the power input rotating element, and a coupling element elastically deformable in an axial direction for coupling the first and second friction portions.

Preferably, the friction element engages the power input rotating element so as to rotate together with the power input rotating element. Preferably, the friction element is disk-shaped, the first friction portion is formed inside the second friction portion, and the coupling element is positioned outside the second friction element. The second friction element is preferably divided into sectors and is thicker than the first friction element.

Preferably, the damper disc assembly further includes a first urging element for urging the first friction element toward the flange, and a second urging element for urging the second friction element toward the disk plate. It is preferable that the second urging element exerts larger urging force than the first urging element.

In the clutch disc assembly according to the present invention, torque caused by rotation of the power input rotating element is transmitted from the power input rotating element to the power output hub via the first elastic element, the disk plate and the second elastic element.

When torsional vibration is transmitted to the power input rotating element, the first elastic element repeats expansion and contraction between the disk plate and the hub if the torsional vibration assumes a small number of seconds of arc. Simultaneously, the first friction portion of the friction element slides between the power input rotating element and the flange to produce a specified magnitude of friction force. When the torsional vibration having a large number of seconds of arc is transmitted to the input rotating element, the second elastic element also repeats expansion and contraction. Simultaneously, the second friction element slides between the power input rotating element and the disk plate to produce a friction force.

As mentioned above, friction elements required in the prior art embodiment can be reduced in number by one since the friction element in the present invention has the first and second friction portions. Additionally, the first and second friction members are coupled by the coupling element elastically deformable in axial directions, and thus, they can move in the axial directions independent of each other.

When the friction element engages the power input rotating element so as to rotate together with the power input rotating element, resultantly the power input rotating element itself slides between the hub and the disk plate, and hence, stable friction force is obtained.

Under the circumstances that the friction element is disk-shaped, that the first friction element is formed inside the second friction element and that the coupling element is positioned outside the second friction element, the first and second friction elements are more independent of each other in the axial directions in the event that the second friction element is divided into sectors, the first and second friction elements are more independent of each other in the axial directions. In the event that the second friction element is thicker than the first friction element, a durability of the damper disc assembly is extended.

When the damper disc assembly further includes the first urging element for urging the first friction element toward the hub and the second urging element for urging the second friction element toward the disk plate, the first friction element is urged by the hub to slide while the second friction element is urged by the disk plate to slide. Urging the first and second friction elements to slide permits friction force to be stable.

A clutch disc assembly according to a second embodiment of the present invention has a power input disc element, a power output hub, an intermediate disc element, a first elastic element, a second elastic element and a friction resistance generating mechanism. The power input disc element receives torque. The power output hub is positioned in an inner circumference of the power input disc element and has a flange. The intermediate disc element is positioned in an outer circumference of the hub. The first elastic element is placed between the intermediate disc element and the flange to restrict relative rotation by them. The second elastic element is placed between the power input disc element and the intermediate disc element to restrict relative rotation between them. The friction resistance generating mechanism includes a first friction element, a second friction element, a first urging element and a second urging element. The first friction element is placed in contact with a side surface of the flange. The second friction element is placed in contact with a side surface of the intermediate disc element and engages the first friction element so as to rotate along with it in unity in a circular direction and to move relative to it in axial directions. The first urging element is supported by the power input disc element and urges the first friction element toward the flange. The second friction element is supported by the power input disc element and urges the second friction element toward the intermediate disc element. Only one of the first and second friction elements has an engaging element which engages the power input disc element so as to rotate along with it in unity in a circular direction and to move relative to it in axial directions.

Both the first and second friction elements are annular in shape, and preferably, the second friction element is positioned close to an outer circumference of the first friction element.

Preferably, the engaging element has a fastener element for preventing the power input disc element from slipping off.

The second friction element preferably has a plurality of notches in an end surface in its inner circumference while the first friction element preferably has projections which extend outward from its outer circumference in radial directions to fit in the notches.

The second urging element preferably has a larger urging force than the first urging element.

The second friction element is preferably formed of a material having a higher friction coefficient than the first friction element.

The friction resistance generating mechanism has its components assembles so as not to fall related to the power input disc element by means of engagement of the engaging element with the power input disc element.

In the damper disc assembly according to the present invention, torque applied to the power input disc element is transmitted to the power output hub via the second elastic element, the intermediate disc element and the first elastic element.

When torsional vibration assuming a small number of seconds of arc is transmitted to the power input disc element, the first elastic element repeats expansion and contraction between the intermediate disk element and the flange. Simultaneously, the intermediate disc element makes relative rotation to the power output hub along with the power input disc element in unity, and the first friction element slides against on the flange to produce a specified level of friction force. When the torsional vibration assuming a large number of seconds of arc is transmitted to the power input disc element, the second elastic element also repeats expansion and contraction in circular directions. The intermediate disc element makes relative rotation to the power input disc element along with the power output hub in unity. Simultaneously, the first friction element slides against on the flange while the second friction element slides against on the intermediate disc element to produce a larger friction force than the previous one. As has been described, producing varied types of torsional properties corresponding to varied levels of torsional vibration brings about effectively dampening the vibrations.

Since the first and second friction elements engage with each other rotatable along with each other in unity in a circular direction, one of the friction elements alone is provided with the engaging element. Thus, the structure of the damper disc assembly is simplified.

The friction resistance generating mechanism is reduced in height in axial directions in the event that both the first and second friction elements are annular in shape and that the second friction element is positioned close to the outer circumference of the first friction element.

Engagement of the engaging element with the power input disc element is facilitated and ensured in the event the engaging element has a fastener element which prevents the power input disc element from slipping off.

Engagement of the first and second friction elements can be implemented in a simple structure in the event that the second friction element has a plurality of notches in an end surface of its inner circumference and that the first friction element has projections engaging the notches.

When the second urging element has a larger urging force than the first urging element, friction force generated in the second friction element is larger than that generated in the first friction element even if both the first and second friction elements are made of the same material.

In the event that the second friction element is made of a material of a higher friction coefficient than the first friction element, the second friction element generates a larger friction force than the first friction element if the same urging force is applied to the first and second friction elements. If the urging force applied to the second friction element is larger than that applied to the first friction element, the friction force generated in the second friction element is further enhanced.

In the event that the friction resistance generating mechanism has its components assembled so as not to fall related to the power input disc element by means of engagement of the engaging element with the power input disc element, the friction resistance generating mechanism can be installed in the power input disc element before assembling the whole. Eventually, this facilitates management over the components before assembling the whole and enhances operation efficiency in assembling the whole.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF THE PREFERRED EMBODIMENTS

Figure 1:
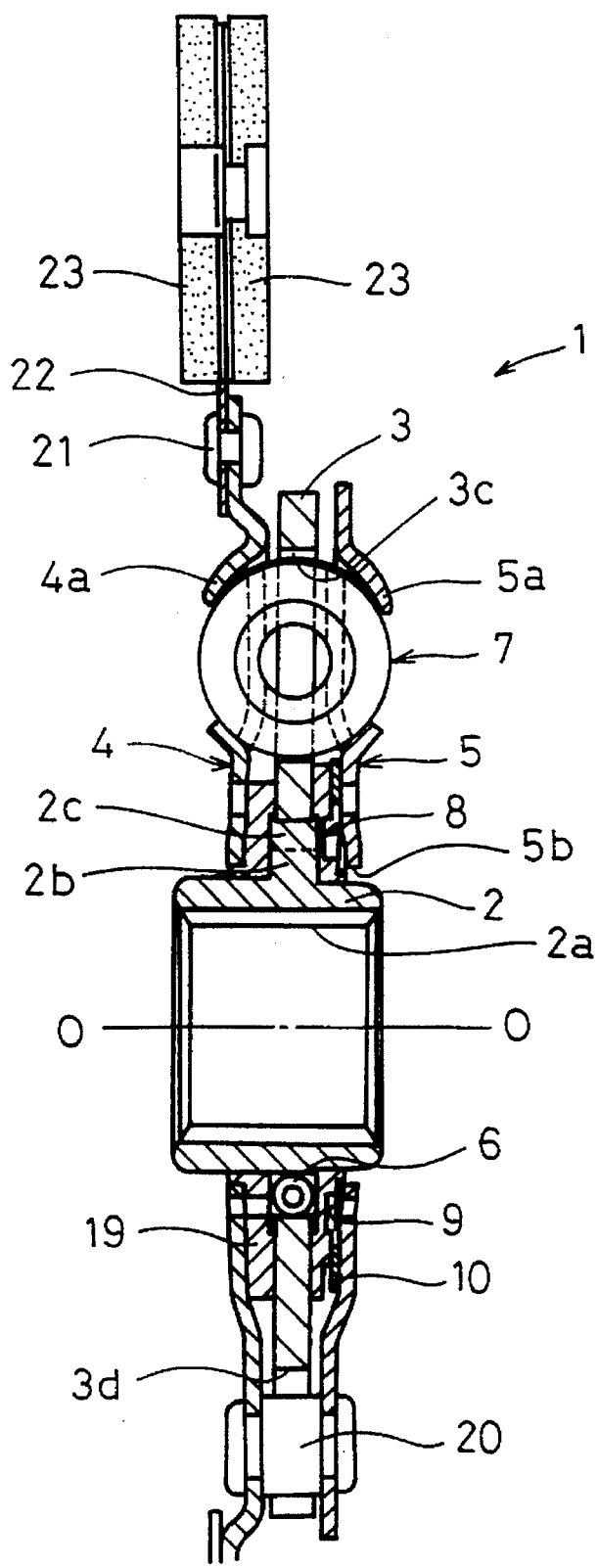
FIG. 1 is a fragmentary, vertical sectional schematic view showing a clutch disc assembly having a hub and friction washers in a first preferred embodiment of the present invention.
Figure 3:
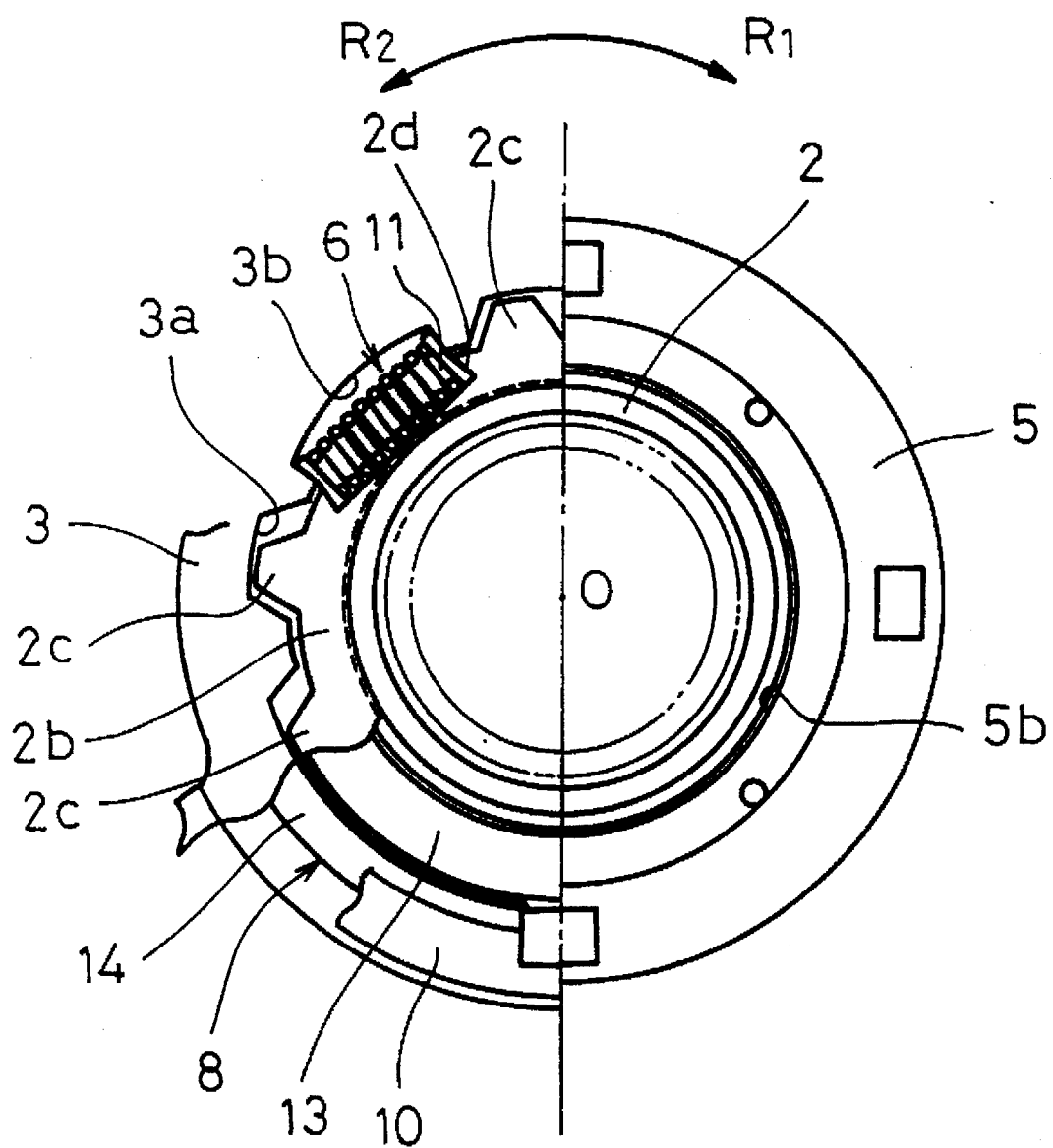
FIG. 3 is a fragmentary, schematic plan view showing engagement of the hub with a flange portion of the clutch disc assembly.
Figure 4:
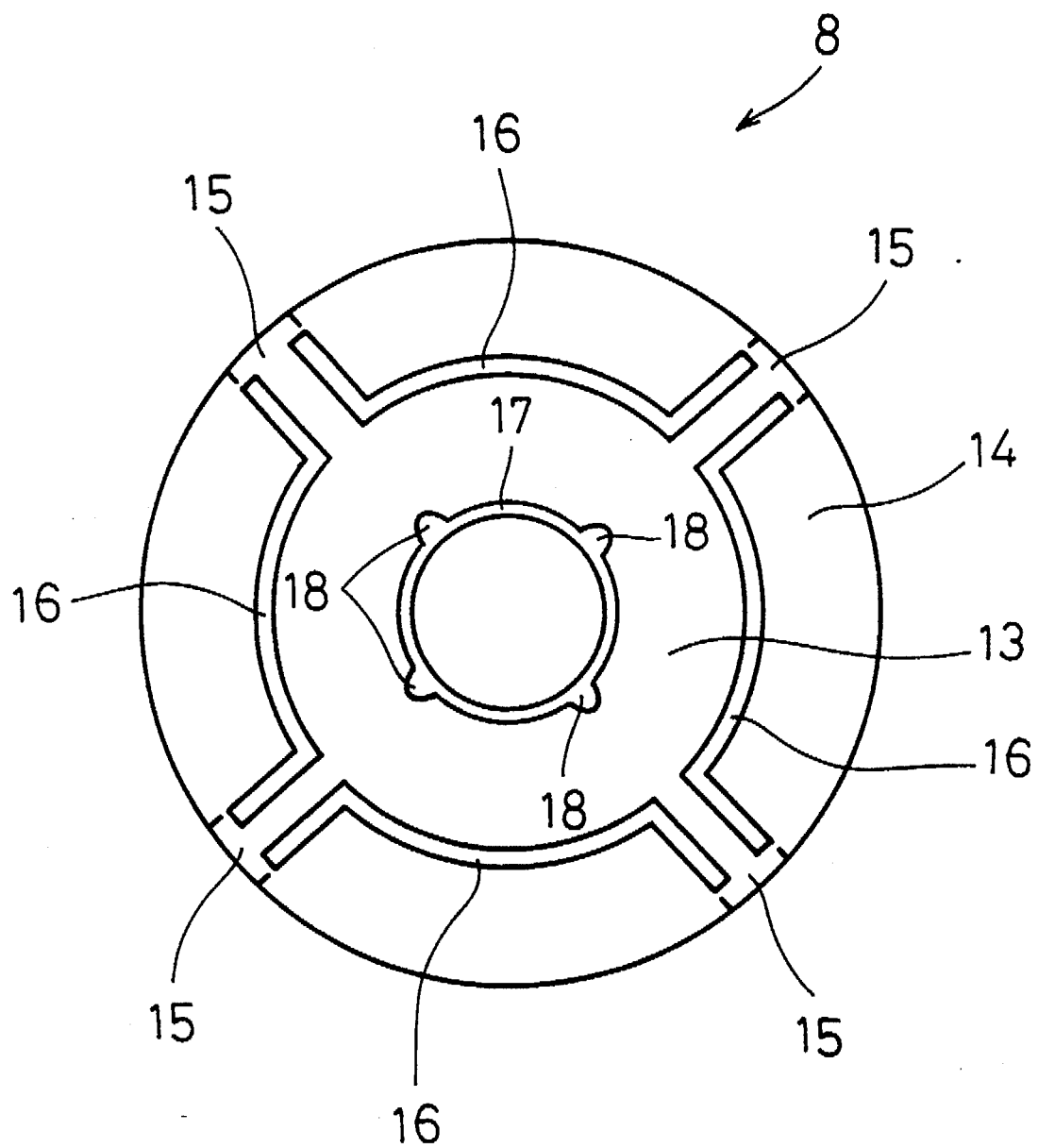
FIG. 4 is an elevation showing a first friction washer of the clutch disc assembly, shown removed from the assembly.

A clutch disc assembly 1 in a first preferred embodiment according to the present invention is shown in FIG. 1. The clutch disc assembly 1 is intended for transmitting torque from an engine (not shown) on the left in FIG. 1 to a transmission device (not shown) on the right in FIG. 1. In FIG. 1, line 0—0 represents the central rotation axis of the clutch disc assembly 1. In FIG. 3, $R_1$ denotes the direction of rotation of the clutch disc assembly 1, and $R_2$ denotes a direction opposite to the rotation of the clutch disc assembly 1.

Figure 8:
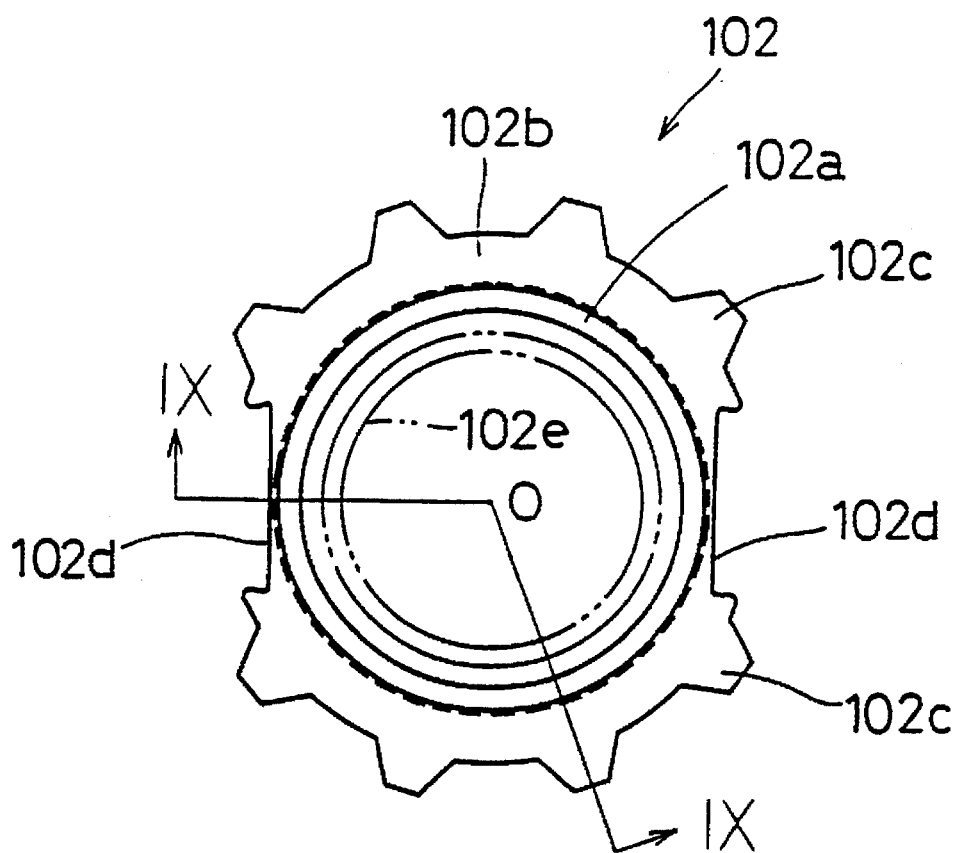
FIG. 8 is a top elevation showing hub of the clutch disc depicted in FIG. 6 shown removed from the clutch disc assembly.

The clutch disc assembly 1 has a hub 2 positioned at its center to be coupled to a shaft (not shown) of a transmission device (not shown). The hub 2 is provided with a spline hole 2a at its center. The hub 2 is also provided with a small flange 2b projecting in an outer circumferential direction. There are a plurality of projections 2c (see FIG. 8) circularly arranged at spaced apart intervals in an outer circumference of the flange 2b. In two positions opposed to each other in a radial direction in the flange 2b, as shown in FIG. 8, receptacles 2d are formed to receive and hold opposite ends of a first coil spring 6, which is described in greater detail below.

A connecting plate 3 is disposed generally in line (in the same plane) and adjacent to an outer circumference of the projections 2c of the hub 2. The connecting plate 8 is a disk-like plate and is provided with a plurality of notches 3a in a positions generally corresponding to each of the projections 2c of the hub 2. A predetermined gap is provided between each of the notches 3a and each of the corresponding projections 2c in a circular direction, and this allows the hub 2 and the connecting plate 3 to rotate relative to each other by a predetermined angle. In a neutral state, or torsion free state, as illustrated in FIG. 3, the projection 2c is positioned on a side of the notch 3a toward the $R_2$ direction.

An inner circumference of the connecting plate 3 is further provided with notches at two points corresponding to the receptacles 2d of the hub 2 hereinafter referred to as receptacles 8b. The first coil spring 6 is disposed within the receptacles 2d and 3b. At opposite ends of the first coil spring 6, spring seats 11 are placed. The spring seats 11 come in contact with a side of the receptacles 2d and opposite ends of the receptacles 3b in a circular direction. It should be appreciated that only one coil spring 6 is depicted in FIG. 3, but a second is provided in further receptacles 2d and 3b at an 180° interval from the one shown in FIG. 3.

Referring now to Figs. I and 2, the connecting plate 3 has a plurality of window holes 3c extending in a circular direction at an intermediate portion in radial directions. In an outer circumferential edge of the connecting plate 3, a plurality of notches 3d are formed at the similar intervals in a circular direction.

Disposed on opposite sides of the connecting plate 3 are a retaining plate 4 and a retaining plate 5. The retaining plate 4 and the retaining plate 5, which constitute a pair of roughly disk-shaped components, are rotatable for limited rotary displacement with respect to the hub 2. The retaining plate 4 and the retaining plate 5 have their respective outer circumferences faced to each other by a contact pin 20. The contact pin 20 passes through each of the notches 3d formed in an outer circumference of the connecting plate 3. A specified gap is retained between the contact pin 20 and the notch 3d in a circular direction. This permits the retaining plate 4 and retaining plate 5 to rotate with respect to the connecting plate 3 although the relative rotation is limited by the contact pin 20 contacting either side of the notch A plurality of cushioning plates 22 are fixed on an outer circumference of the connecting plate 3 by rivets 21. Friction facings 23 are fixed on opposite sides of each of the cushioning plate 22. A fly wheel (not shown) attached to an engine (not shown) is placed on the left of the friction facing 23 in FIG. 1, and when a pressure plate (not shown) forces the fly wheel to press the friction facing 23, torque from the engine is applied to the clutch disc assembly 1.

Raised portions 4a and 5a are formed in the retaining plate 4 and the retaining plate 5, respectively, extending outward in axial directions in a position corresponding to the window hole 3c of the connecting plate 3. A second coil spring 7 is surrounded by the raised portions 4a and 5a within the window hole 3c of the connecting plate 3. The second coil spring 7 is greater in both wire diameter and coil diameter than the first spring 6 and more enhanced in rigidity. Torque from the plates 4 and 5 is transmitted to the connecting plate 3 via the second coil spring intervening between them.

A first friction washer 8, and a first conical spring 9 and a second conical spring 10 are arranged between an inner circumference of the retaining plate 5 and an inner circumference of the connecting plate 3 and projection 2c. The first friction washer 8 is disk-like plate of resin. The first friction washer 8 has a first friction portion 13 formed close to its inner circumference, a second friction portion 14 formed adjacent to its outer circumference, and its coupling portion 15 coupling the first friction portion 13 and the second friction portion 14.

While the coupling portion 15 is excellent in rigidity in a circular direction, it is elastically deformable with low rigidity in axial directions, and hence, the first friction portion 13 and the second friction portion 14 can move independent of each other in axial directions. In the first friction washer 8, the first friction portion 13 and the second friction portion 14 are isolated from each other by a plurality of slits 16. The slits 16 divide the second friction portion 14 into sectors. The sectors are connected to one another in respective outer circumferential portions via the coupling portions 15.

The second friction portion 14 is thicker than the first friction portion 13 and the coupling portions 15. Since the coupling portions 15 are disposed at the outer circumference of the second friction portion 14, that is, it is placed farthest from the first friction portion 13, independence of both the friction portions 13 and 14 from each other in axial directions is further enhanced. The second friction portion 14 is thicker because it is abraded more than the first friction portion 13.

Figure 2:
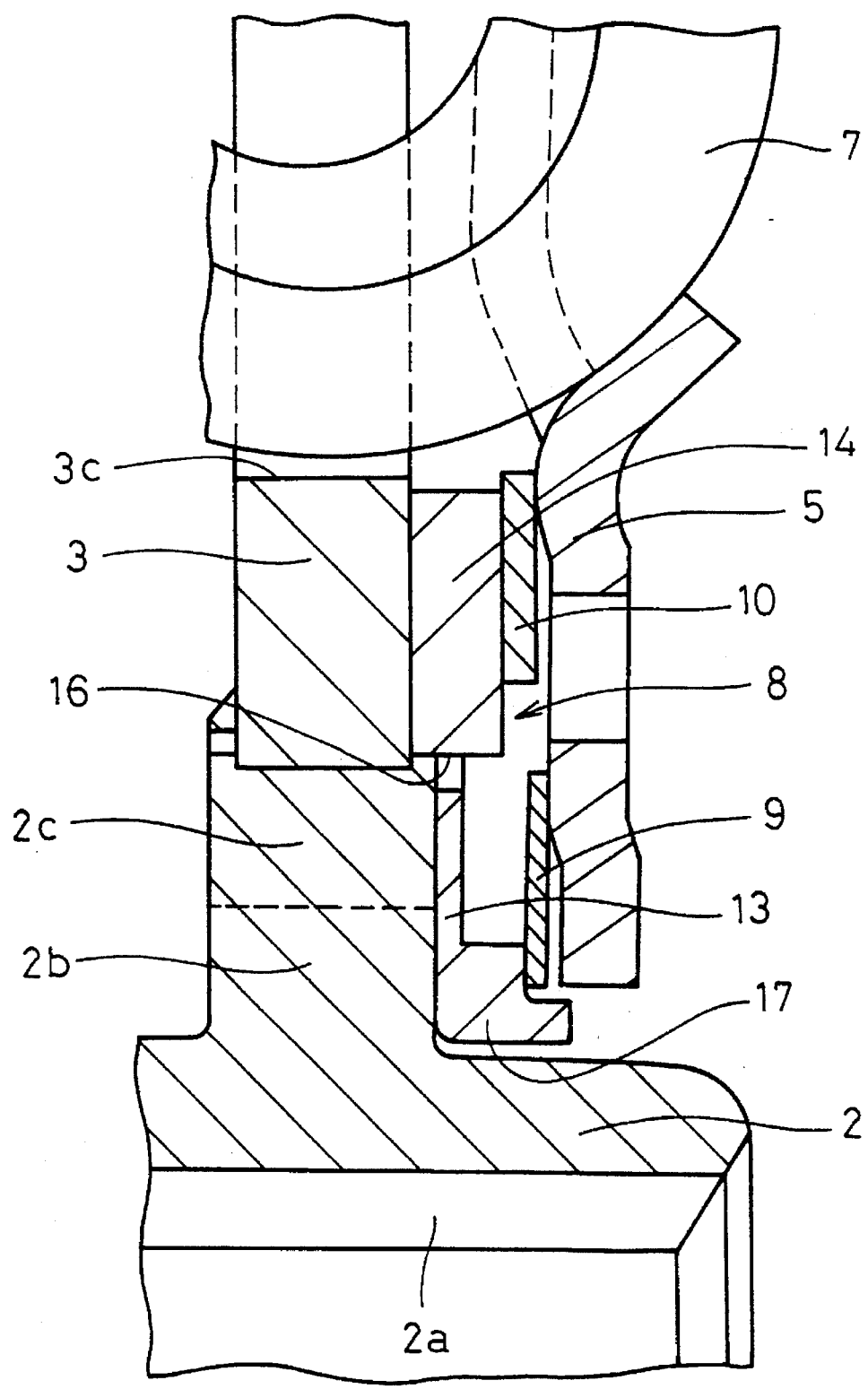
FIG. 2 is a fragmentary, enlarged sectional view of a portion of FIG. 1 showing a portion of the hub.

The first friction washer 8 has its inner circumference portion provided with a cylindrical projection 17 which extends axially outwardly, as is shown in FIG. 2. The cylindrical projection 17 is provided with an engagement element 18 which engages the retaining plate 5 to rotate along with it.

In the embodiment as described above, the first friction portion 13 of the first friction washer 8 is in friction contact with the flange 2b and projection 2c of the hub 2 while the second friction portion 14 is in friction contact with a side of an inner circumference of the connecting plate 3.

An outer circumferential end of the first conical spring 9 comes in contact with the retaining plate 5 while an inner circumferential end thereof urges the first friction portion 13 toward the flange 2b and projection 2c of the hub 2. An outer circumferential end of the second conical spring 10 engages the retaining plate 5 while an inner circumferential end thereof urges the second friction portion 14 of the first friction washer 8 to the side of the inner circumference of the connecting plate 3. Urging force by the second conical spring 10 is larger than that of the first conical spring 9.

As is shown in FIG. 1, a second friction washer 19 is positioned between an inner circumference of the retaining plate 4, and an inner circumference of the connecting plate 3 and the flange 2b and projection 2c of the hub 2. The second friction washer 19 is in contact with the retaining plate 4, the side of the inner circumference of the connecting plate 3, and the flange 2b and projection 2c of the hub 2.

The operation of the clutch disc assembly 1 will be described below.

When the friction facings 23 are pushed against a fly wheel (not shown) of an engine, torque of the flywheel in the engine is applied to the retaining plate 4 and the retaining plate 5. The torque is transmitted to the hub 2 via the second coil spring 7, the connecting plate 3 and the first coil spring 6 and is further transmitted to an shaft (not shown) in a transmission.

When torsional vibration induces of small angles of relative displacement in the clutch disc assembly 1, where the torsional vibration is transmitted from the fly wheel in the engine to the clutch disc assembly 1, relative rotation arises between the plates 4, 5 and the connecting plate 3, and the hub 2. In this situation, the first coil spring 6 repeatedly expands and contracts, and the first friction portion 13 of the first friction washer 8 slides relative to the flange 2b and projection 2c of the hub 2. Properties of low rigidity and small friction force at this time allows torsional vibration having small amounts of displacement to occur. In such a situation, less urging force by the second conical spring 10 is applied to the first friction portion 13 because the first and second friction elements 13 and 14 are movable in axial directions independent of each other, and the first friction portion 13 is not urged so strongly by the flange 2b and projection 2c of the hub 2. Resultantly, excessively large friction force do not arise.

When torsional vibration inducing large angular displacements is transmitted to the clutch disc assembly 1, the connecting plate 3 and the hub 2 rotate integrally with each other, and relative rotation arises between both the elements and the plates 4 and 5. In this situation, the second coil spring 7 repeats expansion and contraction, and the first friction portion 13 of the first friction washer 8 slides against on the flange 2b and projection 2c of the hub 2 while the second friction portion 14 slides against on the side of the inner circumference of the connecting plate 3. Under the circumstance, since the first friction washer 8 increases in sliding surface, a greater friction force is produced, compared with the torsional vibration of a small mount relative displacement. Properties of high rigidity and large friction force allows the torsional vibration of a large mount of relative displacement to be dampened.

As stated above, since the desired property can be obtained depending upon the types of the torsional vibration, the clutch disc assembly effectively dampens the torsional vibration.

In addition to that, integral rotation by the first friction washer 8 and the retaining plate 5 is equivalent to direct sliding of the power input rotating element, and this causes stability of the friction force. Moreover, the first friction washer 8 is urged by the first conical spring 9 and the second conical spring 10, and this also leads to stability of the friction force.

Additionally, a feature and function of two washer used in the prior art can be attained by the single washer, namely, the first friction washer 8, and thus, the number of required components is reduced.

Since the first friction washer 8, although having a complicated shape, is made of resin, fabrication is easily facilitated.

MODIFICATIONS OF THE INVENTION

Figure 5:
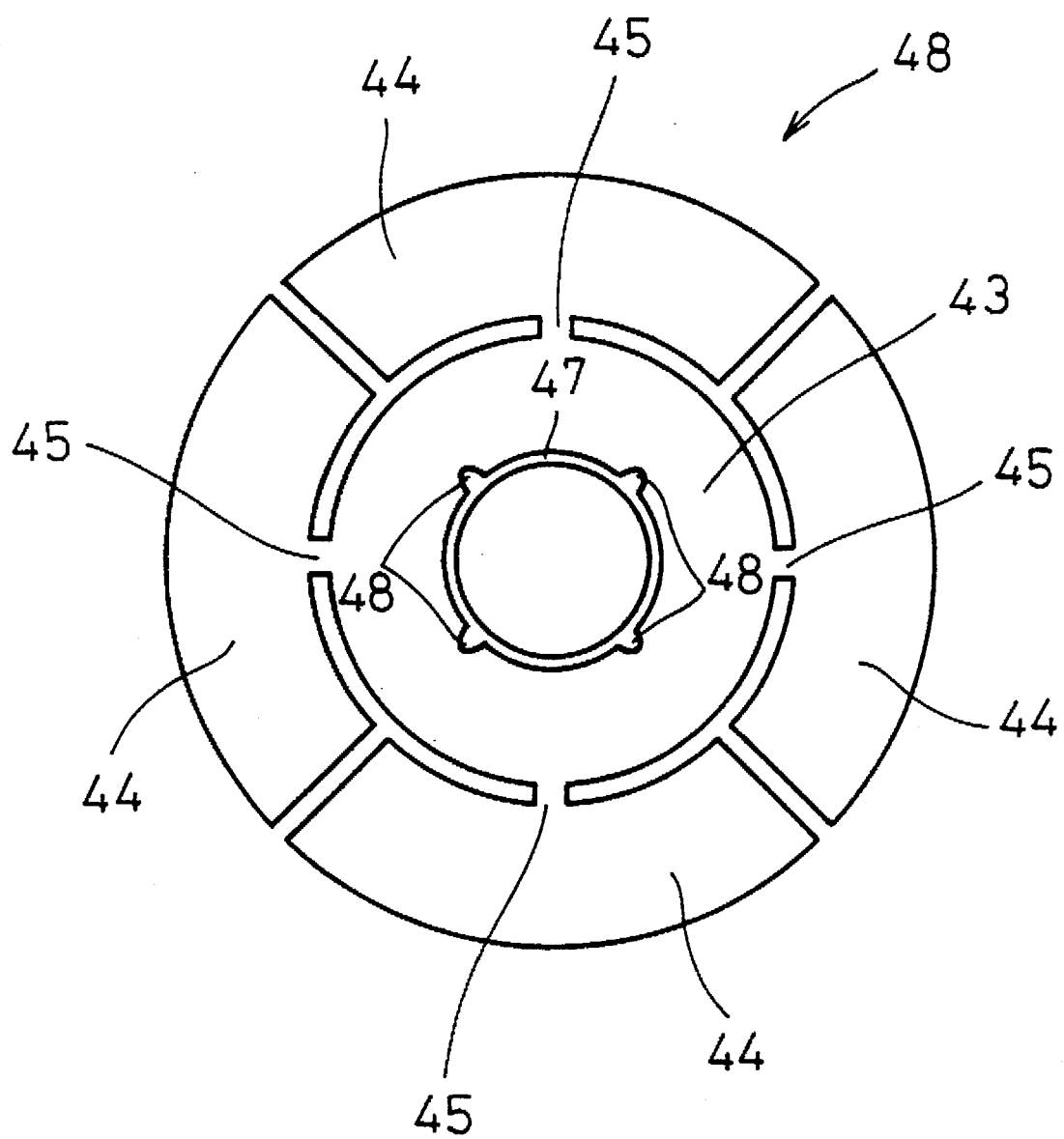
FIG. 5 is an elevation similar to FIG. 4, showing an alternate embodiment of the first friction washer depicted in FIG. 4.

An alternate first friction washer 48 shown in FIG. 5 is a disk-like plate of resin. The first friction washer 48 is comprised of a first friction portion 43, a second friction portion 44 provided in a outer circumference of the first friction portion 43, and a coupling portion 45 coupling both of them. Similar to the above-mentioned preferred embodiment, the second friction portion 44 is thicker than the first friction portion 43. The coupling portion 45, which is made thin as the first friction portion 43 exhibits excellent rigidity in a circular direction but poor in rigidity in an axial direction and elastically deformable. The second friction portion 44 is divided into sectors by slits, and the sectors are isolated from each other. A coupling element 45 is provided in inner circumferential sides of the sectors of the second friction portion 14. Configured in an arrangement as has been mentioned, this embodiment attains the same effects as in the previous preferred embodiment.

In a clutch disc assembly according to the present invention, a friction element has first and second friction portions integral with each other, and thus, there is no need to use two separate friction elements. This leads to decrease in the number of parts of the friction element. Additionally, the first and second friction portions are coupled by a coupling portion which is elastically deformable in axial directions, and thus, they can move in the axial directions independent of each other.

When the friction element engages an power input rotating element for integral rotation with each other, friction force becomes stable.

The first and second friction portions are independent more and more in the axial directions in the event that the friction portion has a disk-like shape, that the first friction portion is formed on a side of an inner circumference of the second friction portion, and that the coupling portion is positioned on a side of an outer circumference of the second friction portion. The first and second friction portions are independent further more in the axial directions in the event that the second friction portion is divided into sectors. When the second friction portion is thicker than the first friction portion, the second friction portion, even if abraded, is durable long.

The clutch disc assembly further has a first urging element for urging the first friction portion to a flange and a second friction urging element for urging the second friction portion to a disk plate, friction force becomes stable.

Figure 6:
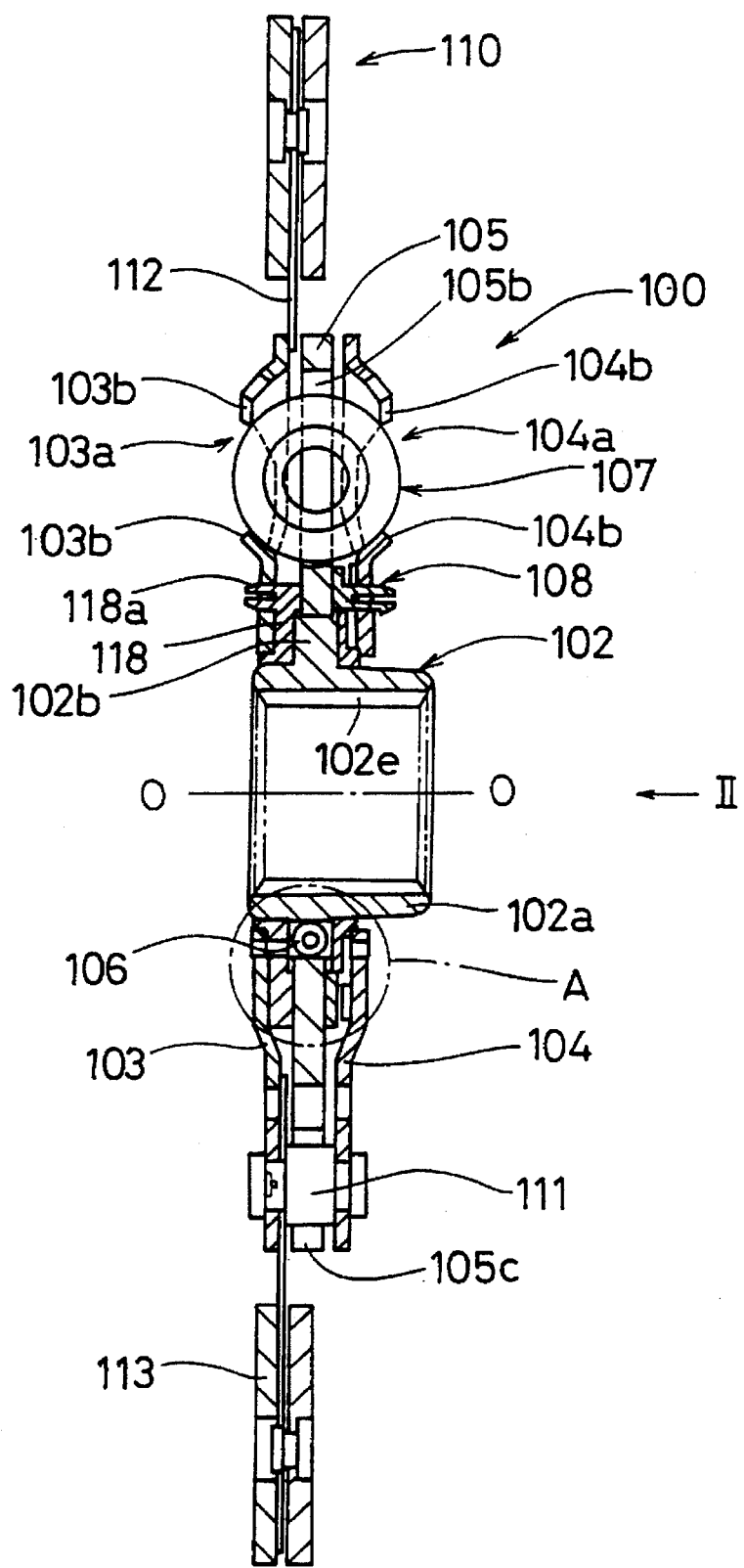
FIG. 6 is a schematic vertical sectional view showing a clutch disc assembly having a hub and friction washers in accordance with a second embodiment of the present invention (the section view in FIG. 6 is taken along the line I—I in FIG. 7)

In a second embodiment of the present invention, a clutch disc assembly 100 is shown in FIG. 6. As shown in FIG. 6, the clutch disc assembly 100 transmits torque from an engine (not shown) on the left in FIG. 6 to a transmission device (not shown) on the right in FIG. 6. In FIG. 6, line 0—0 is a rotation axis of the dutch disc assembly 100.

The clutch disc assembly 100 primarily includes a hub 102 working as a power output element connectable to an input shaft of a transmission (not shown), a clutch plate 103 and retaining plate 104, which serve as a power input element, a sub-plate 105 as an intermediate element, a small coil spring 106 positioned between the sub-plate 105 and the hub 2 to restrict relative rotation by them, large coil springs 107 positioned between the plates 103, 104 and the sub-plate 105 to restrict relative rotation by them, and a friction resistance generating mechanism 108 for generating a specified level of friction force when there arises relative rotary displacement between the plates 103, 104 and the hub 102.

Figure 9:
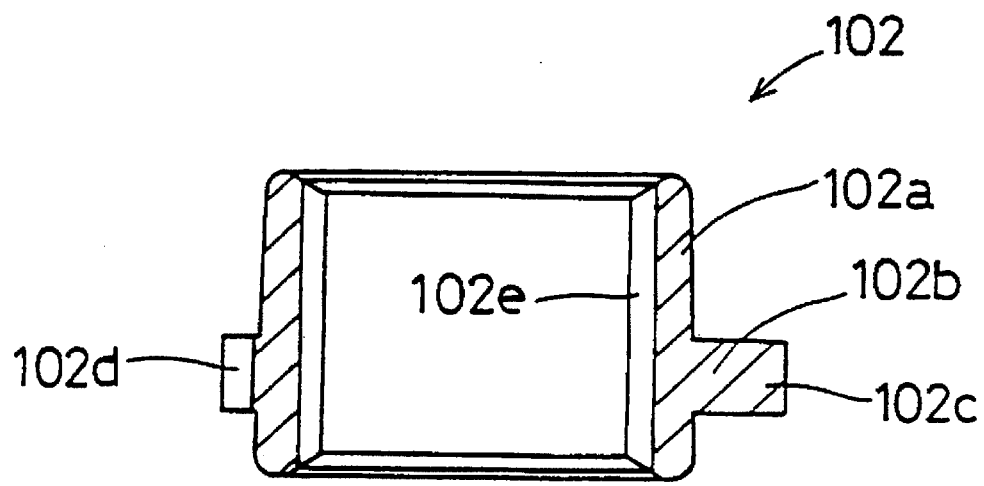
FIG. 9 is a cross sectional view of the hub taken along line IV—IV in FIG. 8.

The hub 102 is positioned at the center of the clutch disc assembly 100. As is shown in greater detail in FIGS. 8 and 9, the hub 102 includes a cylindrical boss 102a extending in axial directions and a flange 102b formed in an outer circumference of the boss 102a integral with it. A plurality of projections 102c are formed at the same interval in a circular direction in an outer circumference of the flange 102b. As shown in FIG. 8, notches 102d are formed on opposite sides in radial directions in the flange 102b to receive opposite ends of the small coil spring 106 in a circular direction, as is described in greater detail below. A spline 102e is formed in an inner circumference of the boss 102a for spline engagement with the shaft (not shown) of the transmission.

Figure 7:
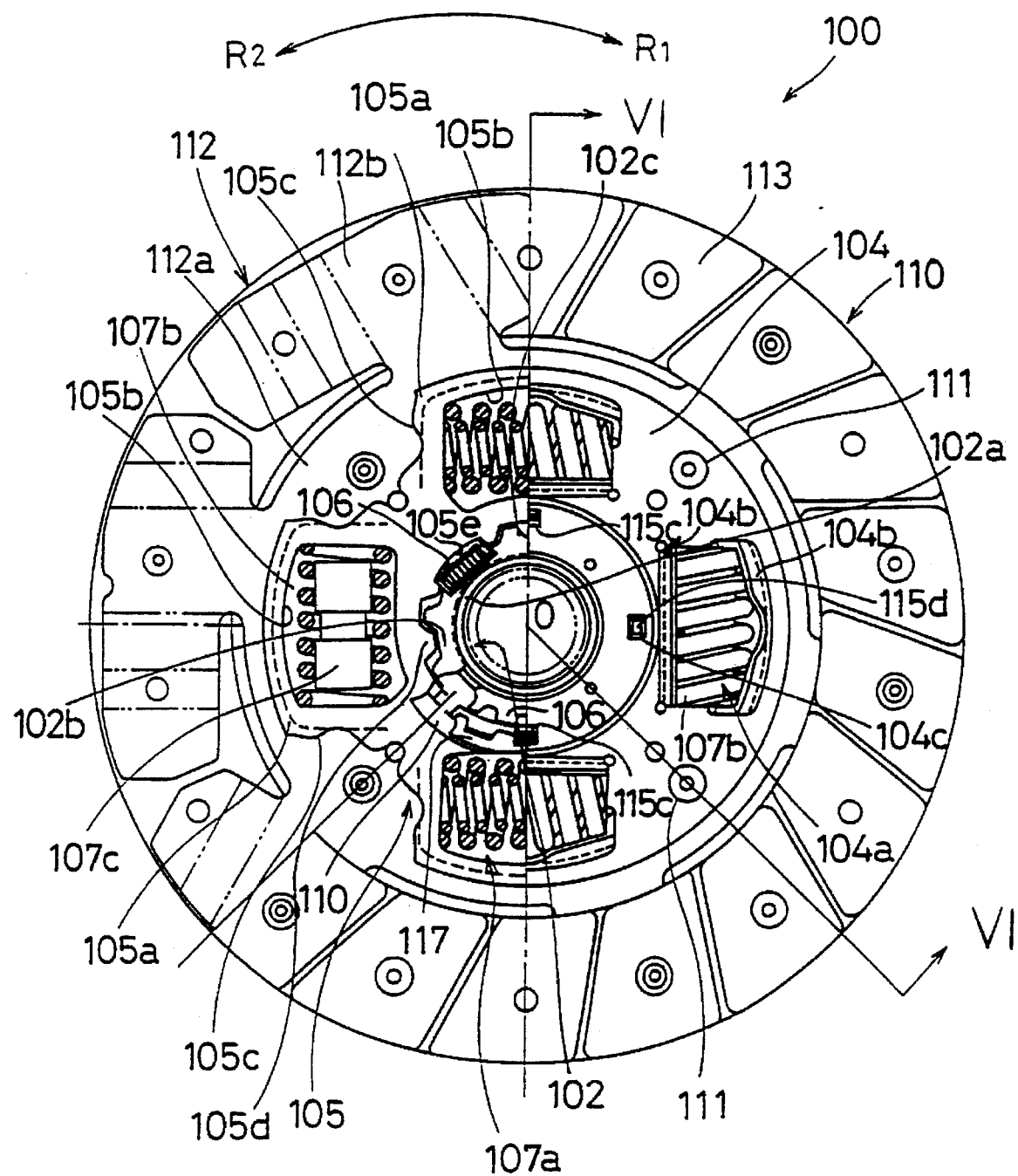
FIG. 7 is a part elevation, part cut-away diagram looking in the direction of the arrow I—I in FIG. 6.
Figure 10:
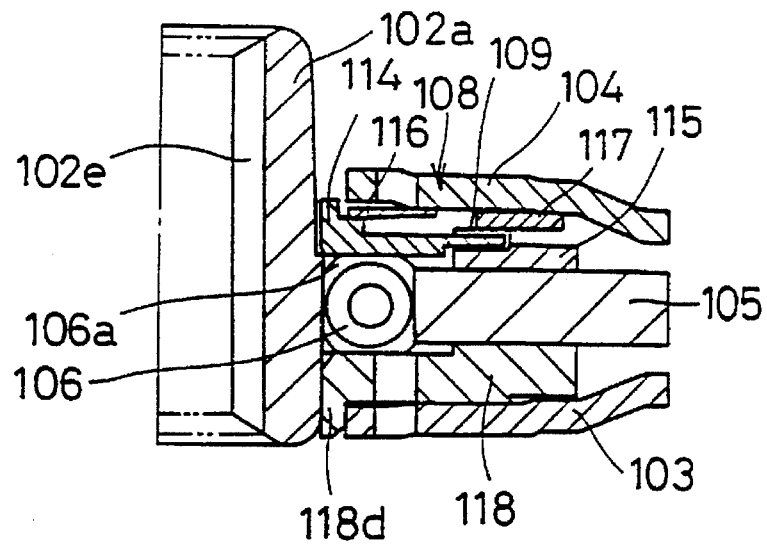
FIG. 10 is a fragmentary enlarged view of an encircled portion of FIG. 6 labeled "A" in FIG. 6.

Referring now to FIGS. 6, 7 and 10, the sub-plate 105 is positioned adjacent to the outer circumference of the flange 102b in the hub 102. The sub-plate is a disk-like plate. As can be seen in FIG. 7, the sub-plate 105 has four projections 105a extending radially outward. Each projection 105a respectively is formed with a window hole 105b extending in circular directions. Between adjacent projections 105a, outer notches 105c are formed. In an inner circumference of the sub-plate 105, inner projections 105d are formed corresponding to positions between adjacent ones of the projections 102c in the hub 102. A predetermined gap in a circular direction is formed between the projections 102c and the inner projections 105d, and this allows the hub 102 and the sub-plate 105 to be displaced with respect to one another by a predetermined angle of rotary displacement. In an inner circumference of the sub-plate 105, inner notches 105e are formed at two points corresponding to the notches 102d in the hub 102. Within the notches 2d and inner notches 105e, small coil springs 106 are retained. Seat elements 106a are put at opposite ends of the small coil spring 106, and they are in contact with a side of the notches 102d and opposite ends in a circular direction of the inner notches 105e. In a neutral direction depicted in FIG. 7, the projections 102c are disposed toward the $R_2$ side of adjacent ones of the inner projections 105d. As will be recognized, the hub 102 is displaced toward the side $R_2$ by a predetermined angle relative to the sub-plate 105.

The clutch plate 103 and the retaining plate 104 are arranged at opposite sides of the sub-plate 105. The clutch plate 103 and the retaining plate 104 are mated as a pair of roughly disk-like elements, and they are arranged for limited rotary displacement with respect to the outer circumference of the boss 102a in the hub 102. The clutch plate 103 and the retaining plate 104 are fixed to each other by contact pins 111 in outer circumference of the clutch plate 103 and retaining plate 104. The contact pins 111 extend through in the outer notches 105c formed in the sub-plate 105 thus allowing for relatively large displacement between connected plates 103 and 104 and the sub-plate 105. The contact pins 111 and the outer notches 105c are spaced from each other by a predetermined distance in circular directions.

As is shown in FIGS. 6 and 7, in an outer circumference of the clutch plate 103, a friction coupler 110 is placed. The friction coupler 110 is primarily comprised of an annular cushioning plate 112 and friction facings 113. The cushioning plate 112 has its annular portion 112a fixed to the clutch plate 103 by the contact pins 111. In an outer circumference of the cushioning plate 112, a plurality of cushioning members 112b are formed. The friction facings 113 are attached to opposite sides of each of the cushioning members 112b. An engine fly wheel (not shown)is placed on the left of the friction facings 113 in FIG. 6, and the torque from the engine is applied to the clutch disc assembly 100 when a pressure plate (not shown) permits the fly wheel to press the friction facings.

The clutch plate 103 and the retaining plate 104 are respectively provided with window holes 103a and 104a in positions corresponding to the window holes 105b in the sub-plate 105 as is shown in FIGS. 6 and 7. Within the window holes 103a and 104a, the second coil springs 107 are positioned. Holders 103b and 104b cut and raised outward in axial directions are formed at opposite sides in radial directions of the window holes 103a and 104a.

There are four of the large coil springs 107, including two of first spring assemblies 107a and two of second spring assemblies 107b. The first spring assemblies 107a are positioned within the window holes 105b in the sub-plate 105 opposed to each other in radial directions. Each of the first spring assemblies 107a includes a first coil spring of a large diameter and a coil spring of a second small diameter positioned inside the first coil spring. Opposite ends in a circular direction of each first spring assembly 107a is in contact with opposite ends in a circular direction of each window hole 105b in the sub-plate 105, opposite ends in a circular direction of each window hole 103a in the clutch plate 103, and opposite ends in a circular direction of each window hole 104a in the retaining plate 104.

The second coil spring assemblies 107b are positioned within the window holes 105b in the sub-plate 105 opposed to each other in radial directions. Each of the second spring assemblies 107b includes a coil spring and an elastic element 107c positioned inside it. Opposite ends in a circular direction of the coil spring in the second spring assembly 107b is in contact with opposite ends in a circular direction of each window hole 105b in the sub-plate 105, opposite ends in a circular direction of each window hole 103a in the clutch plate 103, and opposite ends in a circular direction of each window hole 104a in the retaining plate 104. A length of the elastic element 107c is shorter than a distance between opposite ends in a circular direction of any window hole. Thus, the elastic element 107c is movable in circular directions between the opposite ends in the circular direction of each window hole.

The large coil springs 107 as described above are restricted in its movement in axial directions by the holders 104b in the retaining plate 104 and the holders 103b in the clutch plate 103.

The clutch plate 103 and retaining plate 104 has their respective inner circumference portions provided with four holes 103c and four holes 104c at the same interval in circular directions, in which part of a friction resistance generating mechanism 108 (described in greater detail below) are fitted.

The friction resistance generating mechanism 108 will be described below with reference to FIG. 10.

The friction resistance generating mechanism 108 includes several annular elements positioned on either side of the flange 102b of the boss 102a in a space between the inner circumference of the clutch plate 103 and the inner circumference of the retaining plate 104 in axial directions. The elements of the friction resistance generating mechanism 108 include a first friction washer 114, a second friction washer 115, a first conical spring 116, a second conical spring 117, and a third friction washer 118.

Figure 11:
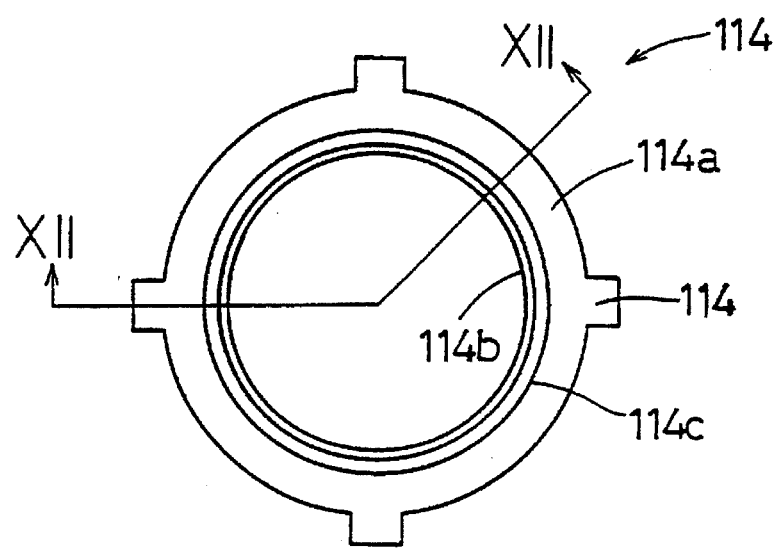
FIG. 11 is a top elevation showing a first friction washer shown removed from the clutch disc assembly depicted in FIG. 6.
Figure 12:
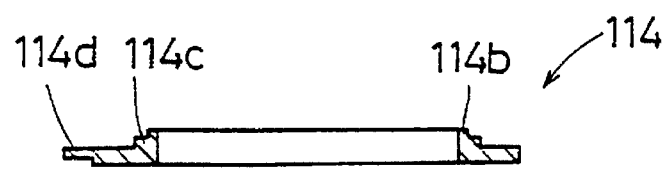
FIG. 12 is a cross sectional view of the first friction washer taken along line VII—VII in FIG. 11.

The first friction washer 114 is a disk-like plate of resin. The first friction washer 114, as shown in FIG. 10 to FIG. 12, has its inner circumferential end adjacent to the boss 102a and one side in contact with side surfaces of the flange 102b and projections 102c of the hub 102 on a side of the transmission. The first friction washer 114 has a disc portion 114a and an annular raised portion 114b projecting from an inner circumference of the disc portion 114a toward the transmission. The annular raised portion 114b is provided with an annular groove 114 close to the transmission. In an outer circumference of the disk element 14a, four projections 114d are formed extending outward in radial directions.

Figure 16:
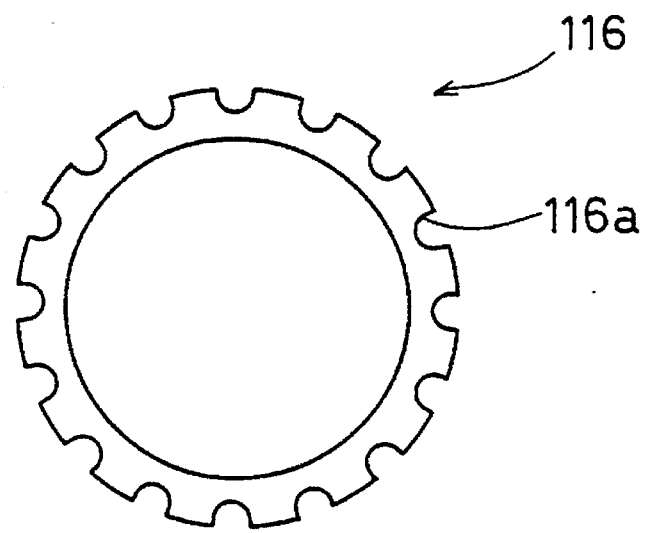
FIG. 16 is a top plan view showing a first conical spring employed in the second embodiment of the present invention, shown removed from the assembly depicted in FIG. 6.

A first conical spring 116 is placed between the first friction washer 114 and the retaining plate 104. The first conical spring 116 has its outer circumferential end supported by the retaining plate 104 and its inner circumferential end in contact with the annular groove 114c which is formed in the annular raised portion 114b of the first friction washer 114. The first conical spring 116, being compressed, is put in position and urges the first friction washer 114 toward the flange 102b and projections 102c of the hub 102. The first conical spring 116 is, as shown in FIG. 16, provided with a plurality of notches 116a in its outer circumference. The notches 116a are useful to diminish variation in the first conical spring 116 due to urging force when abrasion of the first friction washer 114 causes the attitude of the first conical spring 116 to change.

Figure 13:
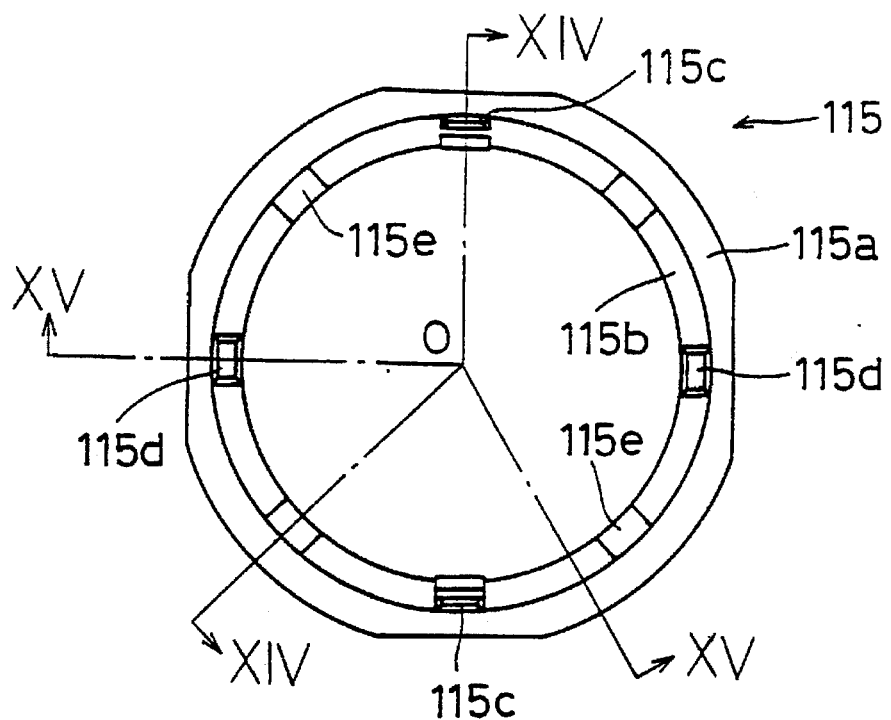
FIG. 13 is a top plan view showing a second friction washer shown removed from the clutch disc assembly depicted in FIG. 6.
Figure 14:
FIG. 14 is a cross sectional view of the second friction washer taken along line IX—IX in FIG. 13.
Figure 15:
FIG. 15 is a cross sectional view of the second friction washer taken along line X—X in FIG. 13.

The second friction washer 115 is, as will be recognized in FIG. 13 to FIG. 15, a disk-like element and placed in almost the same plane as that of the first friction washer 114 and concentric with it on an outer circumference of the first friction washer 114. The second friction washer 115 is preferably made of the same material as the first friction washer 114 and has generally the same friction coefficient. The second friction washer 115 is comprised of a disc portion 115a and an annular raised portion 115b projecting toward the transmission from an inner circumference of the disc portion 115a. An end surface of the disc portion 115a close to the engine comes in contact with an inner circumferential end surface of the sub-plate 105.

In an end surface of the annular raised portion 115b close to the transmission, four notches 115e are formed at the same interval in a circular direction. The projections 114d of the first friction washer 114 are fitted in the notches 115e so that the first and second friction washers 114 and 115 do not rotate relative to each other in circular directions but allow the friction washers to move in axial directions. A specified width of space is retained between each of the projections 114d and each of corresponding concaves (notches) 115e in an axial direction. The annular raised portion 115b is provided with four projections extending axially toward the transmission between adjacent ones of the concaves 115e. These projections include two snap projections 115c and two stem-like projections 115d. In this embodiment, the projections of the same type are disposed so as to be opposed to each other in radial directions. Each of the snap projections 115c is divided into to sections by a slit extending in a radial direction and has a hook-shaped snap fastener at its distal end. The snap projections 115c are inserted in the holes 104c formed in the retaining plate 104. The snap fastener formed in the snap projection 115c prevent the second friction washer 115 from slipping off the retaining plate 104 in axial directions. The stem-like projections 115d are inserted in the remaining holes 104c in the retaining plate 104.

Figure 17:
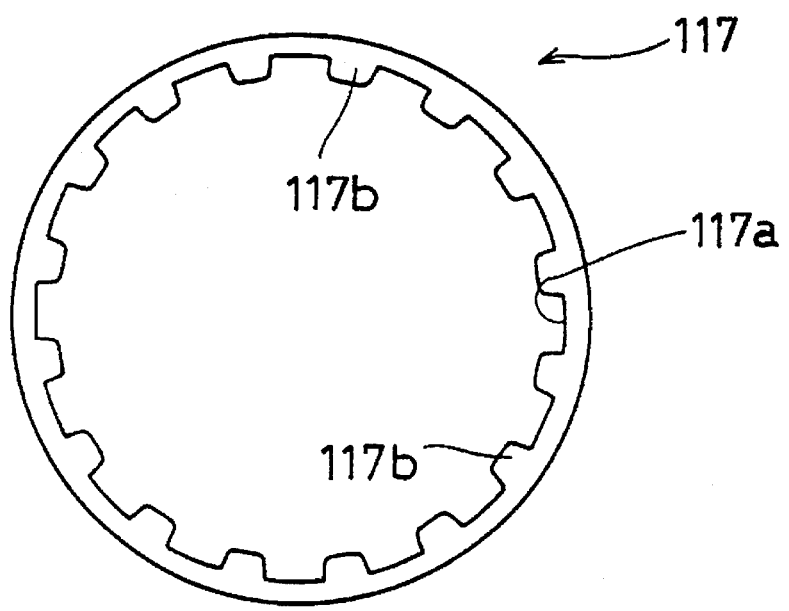
FIG. 17 is a top plan view showing a second conical spring employed in the second embodiment of the present invention, shown removed from the assembly depicted in FIG. 6.

The second conical spring 117 is positioned between the second friction washer 115 and the retaining plate 104 in an axial direction. The second conical spring 117 is, as shown in FIG. 17, provided with a plurality of notches 117a in its inner circumference. The notches 117a are useful to diminish variation in the second conical spring 117 due to urging force when abrasion of the second friction washer 115 causes the attitude of the second conical spring 117 to change. The second conical spring 117, being compressed, is put in position, and it has its outer circumferential end put in contact with the retaining plate 104 and its inner circumferential end or projections 117b put in contact with a side surface of the annular raised portion 115b of the second friction washer 115 close to the transmission. In this way, the second conical spring 117 urges the second friction washer 115 against to a side surface of the sub-plate 105 close to the transmission. Under the circumstance, urging force by the second conical spring 117 is set larger than that by the first conical spring 116. The notches 117a in the second conical spring 117 correspond to the snap projections 115c, stem-like projections 115d and concaves 115e in the second friction washer 115 so that the second conical spring 117 and these elements generally do not interfere with each other.

The third friction washer 118 is positioned between the inner circumference of the clutch plate 103, and the flange 102b of the hub 102 and an tuner circumferential end of the sub-plate 105 in an axial direction. The third friction washer 118 is made of generally the same material as the first and second friction washers 114, 115 and preferably has the same friction coefficient. The third friction washer 118 has its side surface close to the transmission put in contact with a side surface of the flange 102b and a side surface of an inner circumferential end of the sub-plate 105 and its side surface close to the engine put in contact with the clutch plate 3. Snap projections 118a (see FIG. 6) extending toward the engine in axial directions are formed in an outer circumference of the third friction washer 118, and the snap projections 118 are fitted in the holes 103c formed in the clutch plate 103. The snap projections 118a are shaped similar to the above-mentioned snap projection 115c in the second friction washer 115. An annular raised portion 118b, extending toward the engine in an axial direction, is formed in an inner circumference of the third friction washer 118. An inner circumferential end of the clutch plate 103 comes in contact with an outer circumference of the annular raised portion 118b.

Operation of the clutch disc assembly 100 will now be described.

When the friction facings 113 are pressed against the flywheel (not shown) in the engine, torque of the flywheel in the engine is applied to the clutch plate 103 and the retaining plate 104. The torque is transmitted to the hub 102 via the large coil springs 107, the sub-plate 105 and the small coil spring 106 and is further transmitted to the shaft (not shown) in the transmission.

When torsional vibration of a small number of seconds of arc is transmitted from the flywheel (not shown) in the engine to the clutch disc assembly 100, relative rotation arises between the plates 103, 104 and subplate 105, and the hub 102. Simultaneously, the small coil spring 106 repeats expansion and contraction in circular directions, and the first friction washer 114 and the third friction washer 118 slide against on the flange 102b and projections 102c in the hub 102. The properties of low rigidity and of low friction force at this time are effective to dampen the torsional vibration of the small number of seconds of arc displacement.

When torsional vibration of a large number of seconds of arc is transmitted to the clutch disc assembly 100, the small coil spring 106 is compressed to cause rotation of the sub-plate 105 along with the hub 102 in unity, and this causes relative rotation between these elements and the plates 103, 104. Simultaneously, the large coil springs 107 repeat expansion and contractions. The first friction washer 114 slides against on the flange 102b in the hub 102, the second friction washer 115 slides against on a side surface in the inner circumference of the sub-plate 105, and the third friction washer 118 slides against on a side surface of the flange 101b in the hub 102 close to the fly wheel and on a side surface of the inner circumference of the sub-plate 105 close to the flywheel. Under the circumstance, since the second conical spring 117 is set larger in urging force than the first conical spring 116, a great friction force is produced. The properties of high rigidity and of large friction force at this time are effective to dampen the torsional vibration of the large number of seconds of arc displacement.

As stated above, since appropriate properties can be obtained depending upon the types of the torsional vibration, the clutch disc assembly 100 according to the present invention effectively dampens the torsional vibration.

In assembling the clutch disc assembly 100, the first friction washer 114, the second friction washer 115, the first conical spring 116 and the second conical spring 117 in the friction resistance generating mechanism 8 should be, in advance, installed in the retaining plate 104 in subassembly. Such an installation operation is easily carried out by inserting the snap projections 115c and stem-like projections 115d in the second friction washer 115 in the holes 104c in the retaining plate 104. By virtue of the snap projections 115c the second friction washer 115 engages the retaining plate 104, and hence, other components no longer falls. The subassembly permits sections of the whole assembly to be managed in advance, assembling operation is facilitated. In assembling the whole of the clutch disc, also, the subassembly brings about greatly enhanced efficiency in operation. The friction washer 118 may be installed in the clutch plate 103 in advance in the subassembly.

Although the first friction washer 114, the second friction washer 115 and the third friction washer 118 are made of the generally the same material in the previous embodiment, they may also be formed of different materials to vary a friction coefficient among them. In the event that the second friction washer has a larger friction coefficient than the first friction washer 114, the second friction washer 115 can produces a larger friction force than the second friction washer 114 even with the same urging force by both the conical springs.

In the clutch disc assembly according to the present invention, since the first and second friction elements engages with each other so as to rotate along with each other in unity in a circular direction, an engaging element may be provided only in one of the friction elements. This leads to simplification of the structure.

In the event that the first and second friction elements are annular in shape and that the second friction element is positioned on a side of the outer circumference of the first friction element, the friction resistance generating mechanism diminishes its height in an axial direction.

In the event that the engaging element has a fastener element for preventing the power input disc element from slipping off, engagement of the engaging element with the power input disc element is facilitated and ensured.

In the event that the second friction element has a plurality of notches in an inner circumferential end surface and that the first friction element has projections fitted in the notches, engagement of them can be implemented with a simplified structure.

In the event that the second urging element is larger in urging force than the first urging element, friction force produced due to the second friction element becomes larger than that due to the first friction element even if both the friction elements are made of the same material.

In the event that the second friction element is made of a material having a higher coefficient than that of the first friction element, friction force produced due to the second friction element becomes larger than that due to the first friction element if the same urging force is applied to the first and second friction elements. If urging force applied to the second friction element is larger than that to the first friction element, friction force produced due to the second friction element produces further enhanced friction force.

In the event that the friction resistance generating mechanism has its components assembled so as not to fall related to the power input disc element by means of engagement of the engaging element with the power input disc element, the friction resistance generating mechanism is installed in the power input disc element before assembling the whole of the clutch disc. This allows parts and sections of the whole assembly to be managed more easily, and this further leads to enhancement of an operation efficiency in assembling the whole of the clutch disc.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A clutch disc assembly, comprising:

a power input rotating element, a power output hub, a disk plate disposed on an outer circumference of said hub, a first elastic element elastically coupling said disk plate with said hub in a circular direction, a second elastic element elastically coupling said power input rotating element with said disk plate in a circular direction, more rigid than said first elastic element, and a friction element which includes a first friction portion disposed between said power input rotating element and said hub, a second friction portion disposed between said disk plate and said power input rotating element, and a coupling portion elastically deformable in an axial direction for coupling the first and second friction portions;

wherein said friction element is disk-shaped, said first friction portion is formed circumferencially inward of said second friction portion, and said coupling portion is formed circumferencially outward of said second friction portion.

2. The clutch disc assembly according to claim 1, wherein said friction element engages said power input rotating element so as to rotate together with said power input rotating element.

3. The clutch disc assembly according to claim 2, further comprising a first urging .element for urging said first friction portion into engagement with said hub and a second urging element for urging said second friction portion into engagement with said disk plate, said second urging element having its urging force set larger than that of said first urging element.

4. The clutch disc assembly according to claim 1, wherein said second friction portion is formed of arcuate segments with gaps formed therebetween.

5. The clutch disc assembly according to claim 1, wherein said second friction portion is thicker than said first friction portion.

6. A clutch disc assembly, comprising:

a power input rotating element, a power output hub, a disk plate disposed on an outer circumference of said hub, a first elastic element elastically coupling said disk plate with said hub in a circular direction, a second elastic element elastically coupling said power input rotating element with said disk plate in a circular direction, more rigid than said first elastic element, and a friction element which includes a first friction portion disposed between said power input rotating element and said hub, a second friction portion disposed between said disk plate and said power input rotating element, and a coupling portion elastically deformable in an axial direction for coupling the first and second friction portions;

wherein said second friction portion is formed of arcuate segments with gaps formed therebetween.

7. The clutch disc assembly according to claim 6, wherein said friction element engages said power input rotating element so as to rotate together with said power input rotating element.

8. The clutch disc assembly according to claim 6, wherein said friction element is disk-shaped, said first friction portion is formed circumferencially inward of said second friction member, and said coupling portion is formed circumferencially outward of said second friction portion.

9. The clutch disc assembly according to claim 6, wherein said second friction portion is thicker than said first friction portion.

10. The clutch disc assembly according to claim 7, further comprising a first urging element for urging said first friction portion into engagement with said hub and a second urging element for urging said second friction portion into engagement with said disk plate, said second urging element having its urging force set larger than that of said first urging element.

11. A clutch disc assembly, comprising:

a power input rotating element, a power output hub, a disk plate disposed on an outer circumference of said hub, a first elastic element elastically coupling said disk plate with said hub in a circular direction, a second elastic element elastically coupling said power input rotating element with said disk plate in a circular direction, more rigid than said first elastic element, and a friction element which includes a first friction portion disposed between said power input rotating element and said hub, a second friction portion disposed between said disk plate and said power input rotating element, and a coupling portion elastically deformable in an axial direction for coupling the first and second friction portions;

a first urging element for urging said first friction portion into engagement with said hub and a second urging element for urging said second friction portion into engagement with said disk plate, said second urging element having its urging force set larger than that of said first urging element; and wherein said friction element engages said power input rotating element so as to rotate together with said power input rotating element..

12. The clutch disc assembly according to claim 11, wherein said friction element is disk-shaped, said first friction portion is formed circumferencially inward of said second friction member, and said coupling portion is formed circumferencially outward of said second friction portion.

13. The clutch disc assembly according to claim 11, wherein said second friction portion is formed of arcuate segments with gaps formed therebetween.

14. The clutch disc assembly according to claim 11, wherein said second friction portion is thicker than said first friction portion.

* * * * *